(12) United States Patent
Horvath et al.

(10) Patent No.: US 12,462,661 B2
(45) Date of Patent: Nov. 4, 2025

(54) METHOD AND SYSTEM FOR PROVIDING INFORMATION TO A USER DURING THE CHARGING OF AN ELECTRIC ENERGY ACCUMULATOR OF A MOTOR VEHICLE

(71) Applicant: AUDI AG, Ingolstadt (DE)

(72) Inventors: Jürgen Horvath, Pfakofen (DE); Franz Lankes, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 181 days.

(21) Appl. No.: 18/060,394

(22) Filed: Nov. 30, 2022

(65) Prior Publication Data
US 2023/0169844 A1 Jun. 1, 2023

(30) Foreign Application Priority Data
Dec. 1, 2021 (DE) .......................... 102021131527.1

(51) Int. Cl.
| | |
|---|---|
| *G08B 21/18* | (2006.01) |
| *B60L 53/00* | (2019.01) |
| *G01C 21/34* | (2006.01) |
| *G06Q 30/04* | (2012.01) |

(52) U.S. Cl.
CPC .............. *G08B 21/18* (2013.01); *B60L 53/00* (2019.02); *G01C 21/3476* (2013.01); *G06Q 30/04* (2013.01)

(58) Field of Classification Search
CPC ..... G08B 21/18; B60L 53/00; G01C 21/3476; G06Q 30/04
See application file for complete search history.

(56) References Cited

U.S. PATENT DOCUMENTS

| | | | | |
|---|---|---|---|---|
| 2016/0298974 | A1* | 10/2016 | Newlin | ................ G08G 1/0141 |
| 2016/0339792 | A1* | 11/2016 | Khoo | ...................... B60L 53/14 |
| 2018/0105051 | A1* | 4/2018 | Zheng | ................ G06Q 20/3276 |

FOREIGN PATENT DOCUMENTS

| | | |
|---|---|---|
| CN | 106355760 A | 1/2017 |
| CN | 107248201 A | 10/2017 |
| CN | 107622531 A | 1/2018 |
| CN | 112406612 A * | 2/2021 |
| CN | 113218402 A | 8/2021 |
| CN | 113313965 A | 8/2021 |
| DE | 102018117910 A1 | 1/2019 |
| KR | 1020170112403 A | 10/2017 |

* cited by examiner

*Primary Examiner* — Redhwan K Mawari
*Assistant Examiner* — Jeffrey R Chalhoub
(74) *Attorney, Agent, or Firm* — Seed Intellectual Property Law Group LLP

(57) ABSTRACT

A method for providing information to a user during the charging of an electric energy accumulator of a motor vehicle by a charging station comprises, upon fulfillment of a triggering condition, the fulfillment of which is dependent on a connection time at which the motor vehicle is connected to the charging station, and/or an ascertained state of charge of the energy accumulator, putting out a notification message via a communication device of the user, wherein the fulfillment of the triggering condition is further dependent on position information regarding the position of the user and/or that of the communication device.

8 Claims, 1 Drawing Sheet

METHOD AND SYSTEM FOR PROVIDING INFORMATION TO A USER DURING THE CHARGING OF AN ELECTRIC ENERGY ACCUMULATOR OF A MOTOR VEHICLE

BACKGROUND

Technical Field

Embodiments of the invention relate to a method for providing information to a user during the charging of an electric energy accumulator of a motor vehicle by a charging station. In addition, embodiments of the invention relate to a system for providing information to the user.

Description of the Related Art

Electrically driven motor vehicles and hybrid vehicles are becoming increasingly important, so that the demand for use of charging stations for such vehicles is also rising. Since the number of available charging stations is often limited, long occupancy times of charging stations can mean that long waiting times or driving times are required until a free charging station is available. It is therefore a particular problem when charging stations continue to be occupied by vehicles for relatively long times after the charging process is already completed, for example when a user does not retrieve the vehicle for a long time after the charging process.

As a countermeasure, it is known how to require a blocking fee when the motor vehicle is parked beyond a given parking time at the respective charging point, wherein the parking time can be counted either directly from the connection time of the motor vehicle at the charging station or also counted only when a charging process is already completed. Thus, additional fees are produced by lengthy parking at the charging station or by parking beyond a certain time past the charging time.

However, the explained fee-based approach to the avoidance of blockages involves significant additional expense for the users of vehicles being charged, since they must constantly keep in mind when an allowed parking time will presumably elapse. Therefore, document US 2018/0105051 A1 proposes putting out information to users via their smartphone as to the present state of charge of the motor vehicle and to inform them in this way as soon as the charging process is finished. In order to dependably avoid incurring a blocking fee, however, the user must already be in the proximity of the motor vehicle toward the end of the charging process and must adjust his or her plans in dependence on this.

BRIEF SUMMARY

Some embodiments make it easier for a user to avoid a needlessly long blocking of charging stations and especially the incurring of blocking fees.

In some embodiments, the fulfillment of a triggering condition is dependent on position information regarding the position of the user and/or that of the communication device.

Since the fulfillment of the triggering condition is dependent on the position information, the time when the triggering condition is fulfilled and thus when the notification message is put out is dependent on the position information, so that it is possible in particular to notify the user to retrieve the vehicle all the earlier as the user is more distant from the vehicle or will presumably need more time to reach the motor vehicle. Thus, even users who are relatively far away from the motor vehicle can be given timely notification to retrieve the motor vehicle before the end of a permissible parking time at the charging station.

As already explained at the outset, depending on the charging station, the permissible parking time can be reckoned either directly from the connection time or it can begin only upon reaching the predetermined state of charge or at the end of the charging process.

The position information can be ascertained through a position determination device, which can be part of the communication device in particular. The communication device can be, for example, a smartphone or a tablet PC. In particular, it is a mobile communication device, which is carried along with the user, so that the position of the communication device corresponds to the position of the user. In theory, however, it would also be possible for the user to carry along a position determination device configured separate from the communication device, which provides the position information for example to the communication device or to another device evaluating the triggering condition. A satellite-based position determination device will be used, such as a GPS sensor.

The evaluation of the triggering condition can be done basically entirely by a device external to the communication device, for example by the charging station, by the motor vehicle, or by a backend server. In this case, the notification messages could be transmitted by various known protocols, such as SMS or a messenger service, to the communication device and be put out there, especially as a push message.

However, it can be advantageous for the evaluation of the triggering condition to be done in the communication device itself, for example by an app which runs on a smartphone. In this case, the motor vehicle, the charging device, or a backend server interacting with the charging device can send for example information regarding the connection time and/or the state of charge or information ascertained from this, especially a predicted end time for the charging process, to the communication device. Moreover, the length of the permissible parking time after the connection time or the end of the charging process can be transmitted.

Optionally, a time synchronization can be done, for example, in order to put out the notification message at the correct time even when the clock time is set wrong in the communication device or one of the other devices used, or in order to take account of different time zone settings, for example, at the charging station and the communication device.

If the triggering condition depends on the position of the motor vehicle or the charging device, this can also be transmitted to the communication device. Since when charging a motor vehicle at a charging station the position of motor vehicle and charging station should be at least approximately the same, it is enough to transmit the position of the motor vehicle or the charging device. However, it may be advantageous to transmit both positions, for example, in order to identify an inconsistency, which may point to a wrong position detection, an attempted fraud, or the like.

The fulfillment of the triggering condition can be dependent on a distance, determined in dependence on the position information, between the position of the user and/or the communication device and the position of the motor vehicle and/or the charging station. In the most simple case, the dependency can be chosen such that the triggering condition is fulfilled at an earlier time continuously or in multiple stages with increasing distance, other input quantities being equal, so that the user will have a longer time available before returning to the motor vehicle. For example, the triggering condition can be fulfilled at a time chosen to be prior to the end of the permissible parking time, in dependence on the distance. In particular, the chosen time can correspond to a presumable time requirement for the movement of the user to the charging station and/or to the motor vehicle.

A route from the position of the user and/or the communication device to the position of the motor vehicle and/or the charging station can be determined in dependence on the position information and on given map data, and the fulfillment of the triggering condition can be dependent on this route. In this case, the position of the charging station may be dictated, e.g., in the given map data, or the position of the motor vehicle or the charging station can be determined by a further position determination device. The planning of routes between two given positions on the basis of map data is well known in the prior art and shall therefore not be discussed in detail.

Taking into account such a route in the context of the triggering condition makes it possible for example to allow for obstacles standing in the way of the return of the user to the motor vehicle or the charging station along the line of sight, or to take into account the effects of using different means of transportation, as will be further explained below. Thus, the accuracy and robustness of the method is improved as opposed to a purely distance-based evaluation.

A presumable time requirement can be determined, in dependence on the distance and/or the route, for the movement of the user to the charging station and/or to the motor vehicle, and the fulfillment of the triggering condition is dependent on the presumable time requirement. In the most simple case, a constant walking speed of the user will be assumed for this. However, it is also possible to take into account properties of road sections, such as steep ascents or the availability of certain means of transportation in certain road sections or the like. Taking account of the time requirements so determined has already been discussed above.

A transportation information can be dictated by the user, indicating which means of transportation should be considered when determining the route and/or the time requirement, the route and/or the time requirement being determined in dependence on the transportation information. The transportation information can be dictated in particular on the communication device, for example in an app on a smartphone. However, it would also be possible to enter the transportation information for example through operating means of the motor vehicle or the charging station.

Thanks to the described method, for example, the user can indicate whether he or she would like to return solely on foot to the motor vehicle or the charging station or whether he or she would also like to use, for example, public means of transportation and/or a rideshare and/or a bicycle, such as a fold-up bicycle carried along in the trunk of the motor vehicle. By taking into account the chosen means of transportation, the route actually used or the time requirement actually needed for the return can be estimated much more precisely. The determination of routes by taking into account different means of transportation is known in itself, for example from the field of Internet route planning, and shall therefore not be explained more closely.

The route and/or the time requirement can be determined separately for multiple potentially used means of transportation or combinations of means of transportation, whereby the triggering condition can be fulfilled for the different means of transportation or combinations of means of transportation at different times from each other, and each time a notification message can be put out via the communication device of the user at the different times. For example, a return to the motor vehicle or the charging station may be possible in five minutes by using public transit or a bicycle, while it would take 15 to 20 minutes on foot. Accordingly, for example, a first notification message can be put out 20 minutes before the end of the permissible parking time, and a further notification message around 5 minutes before the end of the permissible parking time. In this case, it is possible in particular for the respective notification messages to contain information as to which means of transportation is involved. In addition or alternatively, the notification message can contain a mention that, at a later time, yet another notification message will be put out regarding a return by using a different means of transportation.

The or a route from the position of the user and/or the communication device to the position of the motor vehicle and/or the charging station can be determined in dependence on the position information and on given map data, wherein the notification message concerns route information regarding the route, and/or wherein a navigation function of the communication device is triggered upon fulfillment of the triggering condition in order to direct the user to the position of the motor vehicle and/or the charging station. In this case in particular the map data already explained above and the route planning already explained above can be used. In particular, multiple routes can also be determined, making use of different means of transportation or combinations of means of transportation, among which the user can make a choice dynamically as needed. If the user has dictated transportation information, a route can be put out at first making use of this or these described means of transportations or these described combinations of means of transportation.

The fulfillment of the triggering condition can be further dependent on a predicted end time for the charging of the energy accumulator, which is determined in dependence on the state of charge, and/or on a given parking time, when a fee is incurred in particular for a blocking of the charging station upon its expiration after the connection time or after the end time of the charging of the energy accumulator. In this way, the user can reach the motor vehicle or the charging station punctually before the end of the charging process or in particular before expiration of a permissible parking time.

Some embodiments relate to a system for providing information to a user during the charging of an electric energy accumulator of a motor vehicle, comprising a charging station, the motor vehicle, and a communication device, wherein the charging station and/or the motor vehicle are adapted to detecting a connection time at which the motor vehicle is connected to the charging station, and/or a state of charge of the energy accumulator of the motor vehicle, wherein the communication device on the one hand and the charging station and/or the motor vehicle on the other hand are adapted to jointly carry out the method described herein.

As already explained above, the method including the evaluation of the triggering condition can be carried out by the motor vehicle, the charging station, or a backend server, which can be viewed as being part of the charging station, after which the notification message is transmitted to the communication device, which only need display it. In this case, a customary communication device can be used as part of the system, since this can put out messages when received via different protocols, for example push messages.

Likewise, as already explained, it may be advantageous to migrate the evaluation of the triggering condition to the communication device, for example, to an app which runs on a smartphone. In this case, it is sufficient in regard to the configuration of the charging station or the motor vehicle for these to transmit the required information, i.e., the connection time or the ascertained state of charge and/or information necessary for determining the presumable end of the charging.

Further features explained in regard to the method described herein can be applied, with the benefits mentioned there, to the system described herein, and vice versa.

BRIEF DESCRIPTION OF THE SEVERAL VIEWS OF THE DRAWINGS

Further benefits and details will emerge from the following embodiments, as well as the corresponding drawings.

DETAILED DESCRIPTION

Figure 1:
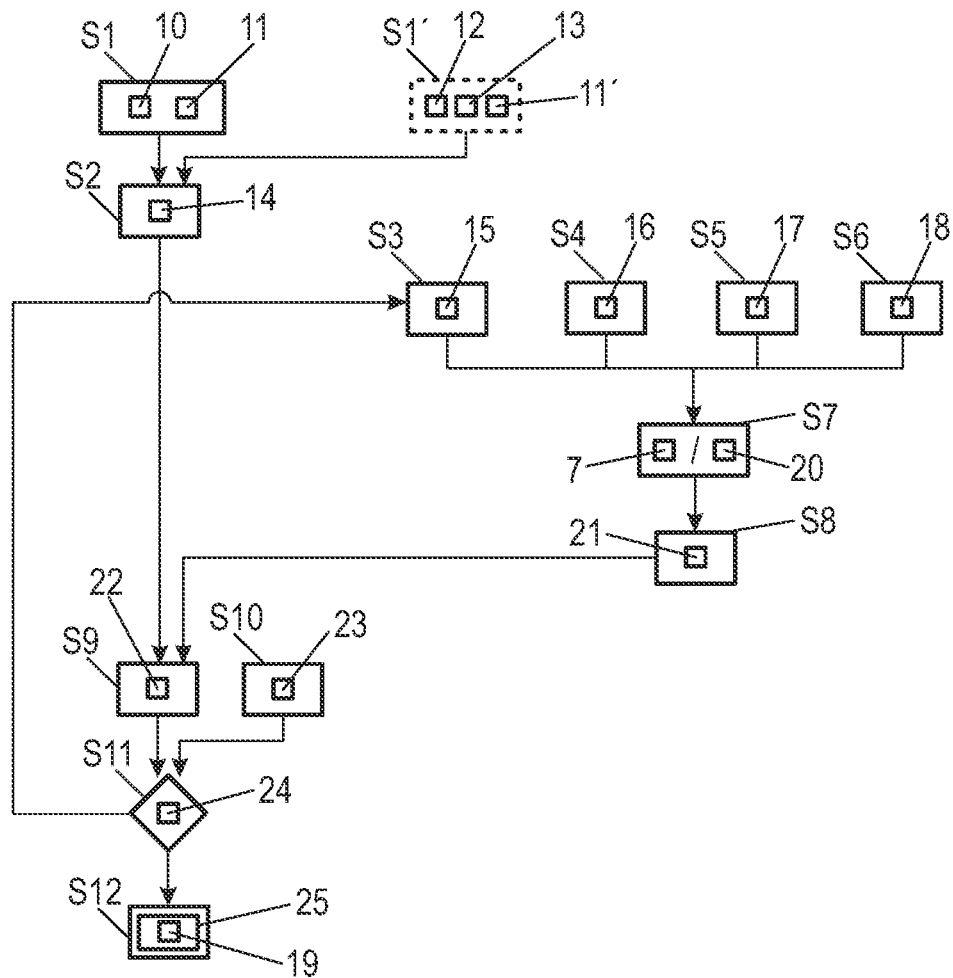
FIG. 1 shows a flow chart of an embodiment of a method for providing information to a user.

FIG. 1 shows a flow chart of a method for providing information to a user during the charging of an electric energy accumulator of a motor vehicle by a charging station. A system comprising the components needed for this and an operating situation in which the explained method is used is represented in FIG. 2, which will also be used in explaining the method.

Figure 2:
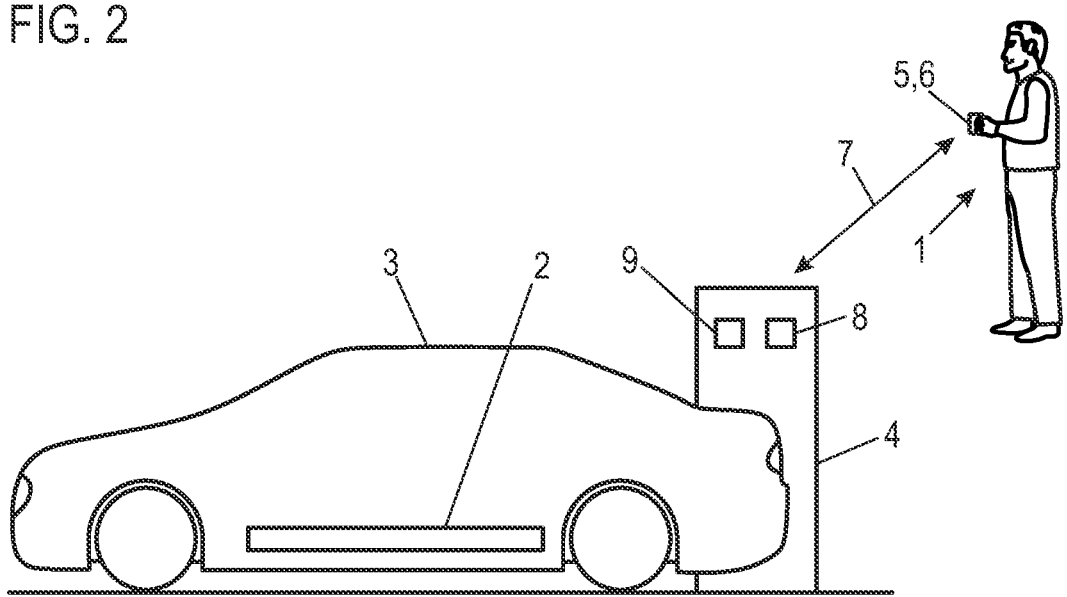
FIG. 2 shows an embodiment of a system for implementing the method explained in regard to FIG. 1.

FIG. 2 shows a motor vehicle 3 which has been connected to a charging station 4 for its charging, while the user 1 who is supposed to move the motor vehicle 3 away from the charging station 4 after the charging process finds himself at a distance from the motor vehicle 3 and the charging station 4, for example, on a shopping spree.

By a communication device 5, for example a smartphone with a suitable app, the user is supposed to be told in good time by a notification message 25 that the charging is completed and that blocking fees are imminent if the motor vehicle 3 remains in its parking position with regard to the charging point 4, that he or she still has enough time to return to the motor vehicle 3 and to remove it from the charging station 4 before additional fees are imposed.

A permissible parking time 11 after expiration of which blocking fees will apply can begin in the most simple instance already with the connection time 10 at which the motor vehicle 3 is connected to the charging station 4. For example, for certain charging stations the condition holds that, regardless of the charging duration, it is only permitted to connect the motor vehicle 3 to a charging station 4 for four hours before additional blocking fees are imposed. For this instance, in step S1 of the example the connection time 10 and the permissible or predetermined parking time 11 is relayed via a communication device 9 of the charging station 4 to the communication device 5 of the user 1.

Next, in step S2, for example by an app running on the communication device 5, a target arrival time 14 of the user 1 at the charging station 4 or at the motor vehicle 3 is determined, in which the parking time 11 is added to the connection time 10 and optionally a tolerance time is subtracted, in order to make sure that the target arrival time 14 is prior to expiration of the parking time 11.

Basically, it is also possible to specify a parking time 11' whose expiration begins only after the end time of the charging of the energy accumulator 2. In this case, step S1 can be replaced by step S1', in which the charging station 4 transmits via the communication device 9 a current state of charge 12 of the energy accumulator 2, further charging parameters 13, such as a charging current strength and a target state of charge, and the parking time 11', to the communication device 5. In an intermediate step not shown, an end time for the charging can be predicted on the basis of the state of charge 12 and the charging parameters 13, to which the parking time 11' can be added in step S2 in order to determine the target arrival time 14.

Regardless of whether step S1 or step S1' is used, the mentioned information can be provided, instead of by the charging station 4, by the motor vehicle 3 using a communication device not shown.

In step S3, position information 15 is detected regarding the position of the user 1 or the communication device 5. A position determination device 6 adapted for this is integrated in the communication device 5 in the example. The position determination device 6 can be, for example, a GPS sensor, which is typically present any way in smartphones. Taking into account the position information 15 makes it possible to notify the user 1 that he or she must remove the motor vehicle 3 from the charging station 4 early enough so that the user 1 has enough time to return to the motor vehicle 3 or the charging station 4.

In order to determine in step S8 the time requirement 21 for such a return with good accuracy, steps S4 to S7 are additionally carried out and will be explained more closely in the following. First of all, however, a simplified variant of the method shall be explained, in which steps S5 and S6 are omitted.

In this simplified variant, in step S4, the position 16 of the motor vehicle 3 or the charging station 4 is ascertained. In the example, this is done by a position determination device 8 of the charging station 4. Additionally or alternatively, however, a fixed position could also be stored in the charging station 4 or one could use a position determination device of the motor vehicle 3, not shown. It may also be advantageous to determine both the position of the motor vehicle 3 and the position of the charging station 4, since a discrepancy of these positions indicates the presence of a malfunction or a manipulation attempt, about which the user 1 can be informed via the communication device 5 or also the operator of the charging station 4.

On the basis of the position of the user 1 or the communication device 5 as described by the position information 15, in step S7 the distance 7 between these positions can be determined. In step S8, on the basis of the distance 7, the presumable time requirement 21 for a return of the user 1 to the motor vehicle 3 or the charging station 4 can then be determined.

However, the determination of the time requirement 21 solely on the basis of the distance 7, especially on the basis of a line of sight distance, may be quite inaccurate, since a substantial detour may be necessary, for example on account of obstacles between the user 1 and the motor vehicle 3, ascents and descents or the terrain in general may affect the speed of movement of the user 1, and so forth. It may therefore be advantageous in step S5 to provide map data 17, such as is used for example in the context of vehicle-based navigation systems or also in a navigation on smartphones. Then, on the basis of the map data 17, a route 20 can be determined in step S7, so that the aforementioned factors or at least some of them can be taken into account in step S8 when determining the time requirement 21.

The remarks thus far have assumed that the user 1 will travel the distance to the motor vehicle 3 on foot. However, it is also possible, for example, for the user 1 to move around by a bicycle within the charging interval, for example with a fold-up bicycle which is otherwise carried along in the motor vehicle 3, or that he or she can make use of public transit for a faster return to the motor vehicle 3, for example.

Therefore, in step S6, the user can specify transportation information 18 for example via the communication device 5 or an operating means of the motor vehicle 3, indicating which means of transportation should be considered when determining the route 20 and the time requirement 21. Thus, for example, he or she can indicate that he or she is willing to make use of public transit for the return, or that he or she has a bicycle available.

The means of transportation considered can on the one hand affect the determined route 20, since for example not all walkable distances can be covered with a bicycle or since public transit is not available on all distances. On the other hand, the means of transportation used has great influence on the time required for a determined route or distance and thus on the time requirement 21.

After the determination of the time requirement 21, in step S9 a triggering time 22 is determined, at which the triggering condition 24 should be fulfillable. This can be done by subtracting the time requirement 21 from the target arrival time 14, so that the triggering time 22 describes the time at which the user 1 should embark on the return to the motor vehicle 3 in order to reach it in good time at the target arrival time 14.

In step S10, the actual time 23 is determined, for example as the system time of the communication device 5. In the example shown, for simplicity, it is assumed that one can assume a time synchronization of the communication device 5 and the motor vehicle 3 or the charging station 4. In one modification of the method, it would be possible, for example, to transmit a time stamp in addition during step S1 or S1', in order to assure such a time synchronization even if an internal clock of one of the mentioned devices is not set correctly or if there are different settings regarding time zones or the like.

In step S11, the triggering condition 24 is checked; for example, this may involve the condition that the actual time 23 is greater than or equal to the triggering time 22. If this is not so, the method can be repeated starting with step S3, so that not only is the actual time 23 updated in future iterations of the method, but so too are the position information 15 and thus the time requirement 21 for the return of the user 1 to the motor vehicle 3.

But if the triggering condition 24 is fulfilled, the notification message 25 can be put out in step S12 to notify the user 1 that he or she should set out on a return to the motor vehicle 3. In order to assist him in this, the notification message 25 can contain route information 19 regarding the route 20, such as a picture or a text description of the route. Alternatively, for example, it would be possible to suitably parametrize a navigation device of the communication device 5, such as a corresponding app, in order to direct the user 1 to the position 16 of the motor vehicle 3 or the charging station 4.

In the example explained, it is assumed that the user 1 specifies the means of transportation to be used for a notification. However, when no transportation information 18 is present, notification messages 25 may be put out at different times, respectively telling the user 1 that he or she should now embark on a return when using a particular means of transportations. For this, the route 20 or the time requirement 21 can be determined separately for multiple potentially used means of transportation or combinations of means of transportation, whereby the triggering condition 24 is also fulfilled for different times for different means of transportation or combinations of means of transportation. Thus, at each of these times a notification message 25 can also be put out, also indicating in particular the means of transportation to which this notification message applies.

German patent application no. 10 2021 131527.1, filed Dec. 1, 2021, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for providing information to a user during charging of an electric energy accumulator of a motor vehicle by a charging station, comprising:
   receiving, via a first communication device of the user, position information regarding a position of the user or a position of the first communication device from a position determination device;
   receiving, via the first communication device, position information regarding a position of the charging station from a second communication device of the charging station;
   receiving, via the first communication device, information regarding a connection time at which the motor vehicle is connected to the charging station from the second communication device;
   receiving, via the first communication device, a time stamp from the second communication device;
   synchronizing, via the first communication device, a clock of the first communication device with a clock of the second communication device based on the time stamp;
   receiving, via the first communication device, information regarding a state of charge of the electric energy accumulator from the second communication device;
   determining, via the first communication device, a predicted end time for the charging of the electric energy accumulator based on the state of charge;
   receiving, via the first communication device, information regarding a parking time, from the second communication device, wherein a fee is incurred for blocking the charging station upon expiration of the parking time after the connection time or upon expiration of the parking time after the predicted end time of the charging of the electric energy accumulator;
   determining, via the first communication device, a first time requirement for movement of the user to the charging station via a first means of transportation;
   determining, via the first communication device, a first triggering time at which a first triggering condition is fulfillable based on the first time requirement for movement of the user to the charging station;
   upon fulfillment of the first triggering condition, outputting a first notification message via the first communication device of the user,
   wherein the first notification message includes information that indicates the first means of transportation,
   wherein the first notification message is output at least the first time requirement for movement of the user to the charging station before expiration of the parking time after the connection time or before expiration of the parking time after the predicted end time of the charging of the electric energy accumulator, such that the user is able to move to the charging station via the first means of transportation before the fee is incurred for blocking the charging station;

determining, via the first communication device, a second time requirement for movement of the user to the charging station via a second means of transportation, wherein the second means of transportation is different from the first means of transportation;

determining, via the first communication device, a second triggering time at which a second triggering condition is fulfillable based on the second time requirement for movement of the user to the charging station;

wherein the second triggering time is different from the first triggering time, upon fulfillment of the second triggering condition, outputting a second notification message via the first communication device of the user, wherein the second notification message includes information that indicates the second means of transportation, and wherein the second notification message is output at least the second time requirement for movement of the user to the charging station before expiration of the parking time after the connection time or before expiration of the parking time after the predicted end time of the charging of the electric energy accumulator, such that the user is able to move to the charging station via the second means of transportation before the fee is incurred for blocking the charging station.

2. The method according to claim 1, further comprising:
determining a distance between the position of the user or the position of the first communication device and the position of the charging station,
wherein the determining the first time requirement for movement of the user to the charging station and the determining the second time requirement for movement of the user to the charging station are based on the distance.

3. The method according to claim 1, further comprising:
determining a first route from the position of the user or the position of the first communication device to the position of the charging station via the first means of transportation based on the position information regarding the position of the user or the position of the first communication device and on given map data,
wherein the determining the first time requirement for movement of the user to the charging station is based on the first route; and
determining a second route from the position of the user or the position of the first communication device to the position of the charging station via the second means of transportation based on the position information regarding the position of the user or the position of the first communication device and on the given map data,
wherein the second route is different from the first route, and
wherein the determining the second time requirement for movement of the user to the charging station is based on the second route.

4. The method according to claim 2, further comprising:
receiving, via the first communication device, position information regarding a position of the motor vehicle,
wherein the first notification message or the second notification message includes the position of the motor vehicle and the position of the charging station.

5. The method according to claim 3, wherein transportation information is dictated by the user, wherein the transportation information indicates the first means of transportation to be considered when determining the first route or the first time requirement and the second means of transportation to be considered when determining the second route or the second time requirement, wherein the determining the first time requirement and the second time requirement for movement of the user to the charging station is are based on the transportation information.

6. The method according to claim 1, further comprising:
triggering a navigation function of the first communication device upon fulfillment of the first triggering condition or the second triggering condition in order to direct the user to the position of the charging station.

7. The method according to claim 1, further comprising:
receiving, via the first communication device, position information regarding a position of the motor vehicle;
determining a first route from the position of the user or the position of the first communication device to the position of the motor vehicle via the first means of transportation based on the position information regarding the position of the user or the position of the first communication device, the position of the motor vehicle, and given map data
wherein the first notification message includes the first route from the position of the user or the position of the first communication device to the position of the motor vehicle using the first means of transportation; and
determining a second route from the position of the user or the position of the first communication device to the position of the motor vehicle via the second means of transportation based on the position information regarding the position of the user or the position of the first communication device, the position of the motor vehicle, and the given map data,
wherein the second notification message includes the second route from the position of the user or the position of the first communication device to the position of the motor vehicle.

8. A system for providing information to a user during charging of an electric energy accumulator of a motor vehicle, comprising:
a charging station,
the motor vehicle,
a first communication device of the user,
a second communication device of the charging station,
wherein the charging station and/or the motor vehicle, in operation, detects a connection time at which the motor vehicle is connected to the charging station, and/or a state of charge of the electric energy accumulator of the motor vehicle,
wherein the first communication device, in operation,
receives position information regarding a position of the user or a position of the first communication device from a position determination device;
receives position information regarding a position of the charging station from the second communication device;
receives information regarding the connection time at which the motor vehicle is connected to the charging station from the second communication device;
receives a time stamp from the second communication device;
synchronizes a clock of the first communication device with a clock of the second communication device based on the time stamp;
receives information regarding the state of charge of the electric energy accumulator;

determines a predicted end time for the charging of the electric energy accumulator based on the state of charge;

receives information regarding a parking time from the second communication device, wherein a fee is incurred for blocking the charging station upon expiration of the parking time after the connection time or upon expiration of the parking time after the predicted end time of the charging of the electric energy accumulator;

determines a first time requirement for movement of the user to the charging station via a first means of transportation;

determines a first triggering time at which a first triggering condition is fulfillable based on the first time requirement for movement of the user to the charging station;

upon fulfillment of the first triggering condition, outputs a first notification message via the first communication device, wherein the first notification message includes information that indicates the first means of transportation, wherein the first notification message is output at least the first time requirement for movement of the user to the charging station before expiration of the parking time after the connection time or before expiration of the parking time after the predicted end time of the charging of the electric energy accumulator, such that the user is able to move to the charging station via the first means of transportation before the fee is incurred for blocking the charging station;

determines a second time requirement for movement of the user to the charging station via a second means of transportation, wherein the second means of transportation is different from the first means of transportation;

determines a second triggering time at which a second triggering condition is fulfillable based on the second time requirement for movement of the user to the charging station;

wherein the second triggering time is different from the first triggering time, upon fulfillment of the second triggering condition, outputs a second notification message via the first communication device of the user, wherein the second notification message includes information that indicates the second means of transportation, and wherein the second notification message is output at least the second time requirement for movement of the user to the charging station before expiration of the parking time after the connection time or before expiration of the parking time after the predicted end time of the charging of the electric energy accumulator, such that the user is able to move to the charging station via the second means of transportation before the fee is incurred for blocking the charging station.

\* \* \* \* \*